(12) United States Patent
Nishio et al.

(10) Patent No.: US 7,309,277 B2
(45) Date of Patent: Dec. 18, 2007

(54) METHOD OF MANUFACTURING HONEYCOMB STRUCTURAL BODY

(75) Inventors: Akifumi Nishio, Ena (JP); Toshiharu Kondo, Nagoya (JP); Takashi Noro, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 10/508,869

(22) PCT Filed: Mar. 7, 2003

(86) PCT No.: PCT/JP03/02735

§ 371 (c)(1),
(2), (4) Date: Sep. 23, 2004

(87) PCT Pub. No.: WO03/082520

PCT Pub. Date: Oct. 9, 2003

(65) Prior Publication Data

US 2005/0166729 A1    Aug. 4, 2005

(30) Foreign Application Priority Data

Mar. 29, 2002  (JP) .............................. 2002-94829

(51) Int. Cl.
*B26D 1/00* (2006.01)
(52) U.S. Cl. ................ 451/51; 451/57; 451/61
(58) Field of Classification Search ........... 451/5, 451/57, 28, 58, 69, 51, 61, 66; 125/21, 5; 83/13

See application file for complete search history.

(56) References Cited

U.S. PATENT DOCUMENTS

| 3,739,679 | A | * | 6/1973 | Schwend ................ 83/789 |
| 4,111,085 | A | * | 9/1978 | Johnson ................. 83/871 |
| 4,335,783 | A | | 6/1982 | McBrayer et al. |
| 4,633,848 | A | * | 1/1987 | Bresciani ............... 125/21 |
| H0244 | H | * | 4/1987 | Goodwin ................ 451/57 |
| 5,145,539 | A | * | 9/1992 | Horikawa et al. ....... 156/89.22 |
| 5,149,475 | A | | 9/1992 | Horikawa et al. |
| 5,487,694 | A | * | 1/1996 | Deming ................. 451/49 |
| 5,837,084 | A | * | 11/1998 | Barss .................. 156/197 |
| 6,273,082 | B1 | * | 8/2001 | Tselesin ............... 125/15 |
| 6,776,689 | B2 | * | 8/2004 | Eichelberger ............ 451/8 |
| 2003/0121596 | A1 | * | 7/2003 | Greven ................. 156/196 |

FOREIGN PATENT DOCUMENTS

| EP | 1 128 031 A1 | 8/2001 |
| JP | A 56-129113 | 10/1981 |
| JP | B2 61-51240 | 11/1986 |

(Continued)

*Primary Examiner*—Jacob K. Ackun, Jr.
(74) *Attorney, Agent, or Firm*—Oliff & Berridge, PLC

(57) ABSTRACT

A method of manufacturing a honeycomb structure of the present invention is a method of obtaining a honeycomb structure 10 having a predetermined shape by processing a peripheral portion of a crude honeycomb structure 2, the method being characterized in that the peripheral portion of the crude honeycomb structure 2 is processed by a cutter having linear cut-off device. It is possible to effectively manufacture a honeycomb structure suitably used in a carrier for a catalyst having a catalytic action, for use in internal combustion engine, boiler, chemical reactor, reformer for fuel cell, etc., or as a filter for trapping particulate matter present in an exhaust gas by the method at low cost.

22 Claims, 5 Drawing Sheets

FOREIGN PATENT DOCUMENTS

| | | |
|---|---|---|
| JP | A 64-58472 | 3/1989 |
| JP | A 3-169347 | 7/1991 |
| JP | A 3-270895 | 12/1991 |
| JP | A 4-57675 | 2/1992 |
| JP | A 8-28246 | 1/1996 |
| JP | A 2001-96116 | 4/2001 |
| JP | A 2001-96524 | 4/2001 |
| JP | A 2001-191240 | 7/2001 |

* cited by examiner

FIG.1(a)
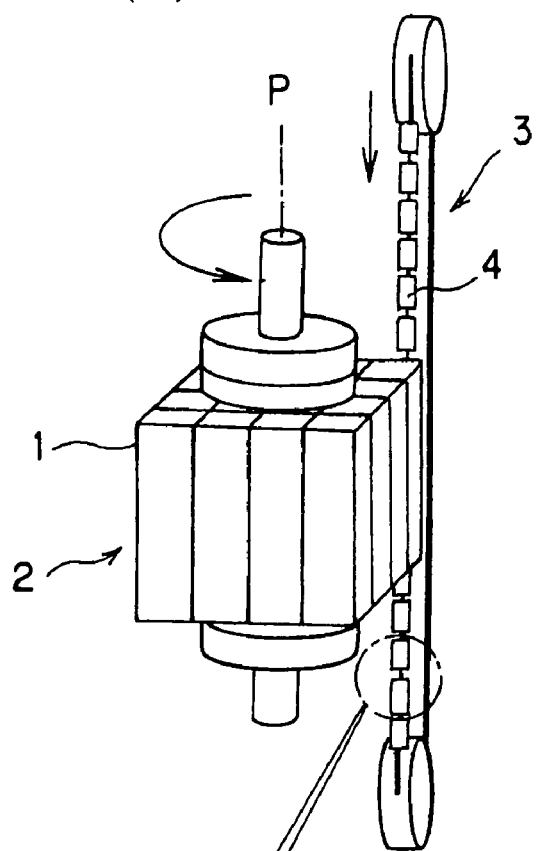
FIG.1(b)
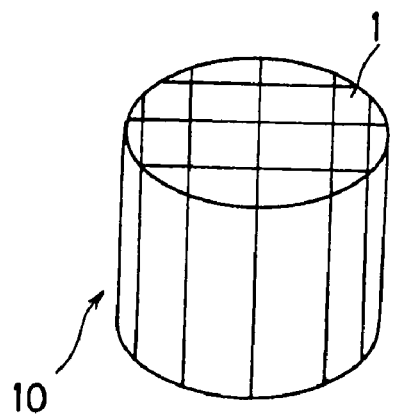
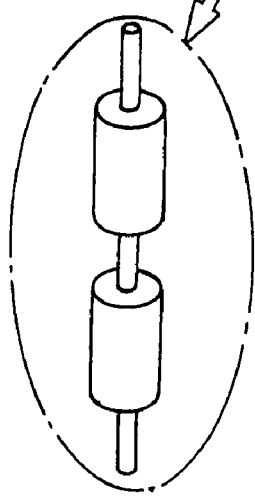
FIG.1(c)
FIG.1(e)
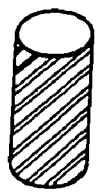
FIG.1(d)
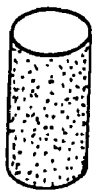

METHOD OF MANUFACTURING HONEYCOMB STRUCTURAL BODY

TECHNICAL FIELD

The present invention relates to a method for manufacturing a honeycomb structure. More specifically, the present invention relates to a method which can be low in cost and efficiently manufacture a honeycomb structure suitably used as a carrier for a catalyst having a catalytic action, for use in internal combustion engine, boiler, chemical reactor, reformer for fuel cell, etc., or as a filter for trapping particulate matter present in an exhaust gas.

BACKGROUND ART

Honeycomb structures are in use as a carrier for a catalyst having a catalytic action, for use in internal combustion engine, boiler, chemical reactor, fuel cell reformer, etc. and a filter for trapping particulate matter present in an exhaust gas, particularly particulate matter emitted from a diesel engine.

In the honeycomb structure used for such a purpose, the sharp temperature change of exhaust gas and the local heating makes non-uniform the temperature distribution inside the honeycomb structure and there have been problems such as crack generation in honeycomb structure and the like. When the honeycomb structure is used particularly as a filter for trapping a particulate matter in an exhaust gas emitted from a diesel engine (hereinafter the filter is referred as DPF), it is necessary to burn the fine carbon particles deposited on the filter to remove the particles and regenerate the filter and, in that case, high temperatures are inevitably generated locally in the filter; as a result, cracks have tended to be generated by a large thermal stress.

Hence, there have been proposed processes for producing a honeycomb structure by bonding a plurality of individual segments using a bonding agent. In, for example, U.S. Pat. No. 4,335,783 is disclosed a process for producing a honeycomb structure, which comprises bonding a large number of honeycomb parts using a discontinuous bonding agent. Also in JP-B-61-51240 is proposed a thermal shock resistant rotary regenerative ceramic heat exchanger which is formed by extrusion forming a matrix segment of honeycomb structure made of a ceramic material; firing them; making smooth, by processing, the outer peripheral portion of the fired segment; coating the part subject to bonding of the resulting segment with a ceramic bonding agent which turns, after firing, to have substantially the same chemical composition as the matrix segment and a difference in thermal expansion coefficient of 0.1% or less at 800° C.; and firing the coated segments.

Also in the SAE paper 860008 of 1986 is disclosed a ceramic honeycomb structure obtained by bonding cordierite honeycomb segments with a cordierite cement. Further in JP-A-8-28246 is disclosed a ceramic honeycomb structure obtained by bonding honeycomb ceramic members with an elastic sealant made of at least a three-dimensionally intertwined inorganic fiber, an inorganic binder, an organic binder and inorganic particles.

The honeycomb structure arranged as described above is ordinarily manufactured by forming honeycomb segments having cells disposed parallel to a central axis of the honeycomb segment, each cell being surrounded by porous partition walls functioning as filters, and each cell functioning as a fluid passage, combining the honeycomb segments to form a crude honeycomb structure, and processing a peripheral portion of the crude honeycomb structure in a predetermined shape. Since the honeycomb structure manufactured as described above is accommodated in a metal can body and the like for use, it must be processed so that it has an outer peripheral shape corresponding to an inner shape of the metal can body and the like. That is, it is necessary to manufacture a honeycomb structure from the crude honeycomb structure described above by processing the peripheral portion of the crude honeycomb structure in a shape corresponding to the inner shape of the metal can body and the like in which the crude honeycomb structure is accommodated.

There has been known a method of processing the peripheral portion of the crude honeycomb structure by a grinder, for example, a cam grinder, a cylindrical grinder, and the like as a method of manufacturing the honeycomb structure. For example, there have been proposed a method of manufacturing a honeycomb structure by grinding a porous ceramic material to various sizes and shapes using a grind member having grind stones disposed on the circumferential portion of a disc, and a method of manufacturing a honeycomb structure having various shapes by moving a position of a grind member in synchronism with rotation of a porous ceramic material under numerical control (NC) using a computer (JP-A-2001-191240).

In the methods described above, however, when a body to be ground(a body to be processed) is a crude honeycomb structure 102 formed by combining a plurality of honeycomb segments 101 as shown in FIG. 5 and peripheral portions of the crude honeycomb segments 102 are processed by the grinder, for example, the cam grinder, the cylindrical grinder, and the like, there is a problem in that a processing speed is restricted in a range in which the crude honeycomb structure 102 is not broken. This is because a rotating direction of a grind stone 103 is in coincidence with a direction in which the honeycomb segments 101 are exfoliated and the crude honeycomb structure 102 is broken on a bonding surface 104 of the honeycomb segments 101 constituting the crude honeycomb structure 102. Accordingly, the above methods are disadvantageous in that the crude honeycomb structure 102 cannot be effectively processed.

Moreover, when the crude honeycomb structure 102 is formed in a shape having corners, for example, it is a rectangular parallelepiped as shown in FIG. 5, there is also a problem in that a probability of breakage of the crude honeycomb structure 102 is increased by an impact generated when a corner portion of the crude honeycomb structure 102 is ground by the grind stone 103. Further, since the body to be ground is the porous ceramic material and has a high processing resistance due to its hardness, the grind stone 103 is worn at a high speed (has a short life as a tool), from which a problem arises in that these methods are not advantageous in cost.

The present invention has been made in view of the above situation and aims at providing a method which can be low in cost and efficiently manufacture a honeycomb structure suitably used as a carrier for a catalyst having a catalytic action, for use in internal combustion engine, boiler, chemical reactor, reformer for fuel cell, etc., or as a filter for trapping particulate matter present in an exhaust gas.

DISCLOSURE OF THE INVENTION

As a result of a diligent study for achieving the above object, the inventors have completed the present invention by finding that the above object can be achieved by processing a shape of a peripheral portion of a crude honeycomb structure by a cutter having linear cut-off device. According to the present invention, following method for manufacturing a honeycomb structure is provided.

[1] A method for manufacturing a honeycomb structure, the method comprising a step of processing a peripheral portion of a crude honeycomb structure to obtain a honeycomb structure with predetermined shape, characterized in that the step of processing a peripheral portion of a crude honeycomb structure is made by a cutter having linear cut-off device.

With the above arrangement, the honeycomb structure can be effectively manufactured at low cost.

[2]. The method for manufacturing a honeycomb structure according to the above [1], wherein the cutter is a bead saw having a linear cutter as the linear cutting device comprising a linear body and any of diamond abrasive grain, general grind stone and multi-blade cutter disposed on the linear body.

[3] The method for manufacturing a honeycomb structure according to the above [1] or [2], wherein the method comprising steps of forming honeycomb segments having cells disposed parallel to a central axis of the honeycomb segment, each cell being surrounded by porous partition walls functioning as filters, and each cell functioning as a fluid passage; combining the honeycomb segments to form the crude honeycomb structure; processing the crude honeycomb structure by the bead saw to obtain a honeycomb structure with a predetermined shape.

[4] The method for manufacturing a honeycomb structure according to the above [1] or [2], wherein the method comprising steps of: forming honeycomb segments having cells disposed parallel to a central axis of the honeycomb segment, each cell being surrounded by porous partition walls functioning as filters, and each cell functioning as a fluid passage; combining the honeycomb segments to form the crude honeycomb structure; roughly processing the crude honeycomb structure by the bead saw to obtain a roughly processed honeycomb structure with a predetermined shape; and finishing the roughly processed honeycomb structure to obtain the honeycomb structure with a predetermined shape.

[5] The method for manufacturing a honeycomb structure according to any of the above [2] to [4], wherein the step of processing the peripheral portion of the crude honeycomb structure is made by rotating the crude honeycomb structure about a central axis thereof, causing the linear cutter of the bead saw to travel in a direction of the central axis, and pressing the linear cutter against the crude honeycomb structure from a side face thereof.

[6] The method for manufacturing a honeycomb structure according to the above [5], wherein the step of processing the peripheral portion of the crude honeycomb structure is made by one continuous operation after the linear cutter is pressed against the crude honeycomb structure from the side face thereof.

[7] The method for manufacturing a honeycomb structure according to any of the above [1] to [6], wherein the peripheral portion of the crude honeycomb structure is processed such that a sectional shape of the crude honeycomb structure is formed in a round shape, an oval shape, an elliptical shape, a triangular shape, a polygonal shape, or an irregular shape when it is cut off along a plane perpendicular to the central axis thereof.

BRIEF DESCRIPTION OF THE DRAWINGS

FIGS. 1(a) to 1(e) are explanatory views and partly enlarged views schematically showing an embodiment of a method of manufacturing a honeycomb structure of the present invention, wherein FIG. 1(a) shows a processing state of a crude honeycomb structure, FIG. 1(b) shows a shape of a honeycomb structure, FIG. 1(c) shows diamond abrasive grain constituting a linear cutter, FIG. 1(d) shows a general grind stone, and FIG. 1(e) shows amulti-blade cutter constituting the linear cutter, respectively.

FIGS. 2(a) to 2(d) are explanatory views schematically showing another embodiment of the method of manufacturing the honeycomb structure of the present invention, wherein FIG. 2(a) shows a rough processing state of a crude honeycomb structure, FIG. 2(b) shows a shape of the crude honeycomb structure, FIG. 2(c) shows a finishing state of the crude honeycomb structure, and FIG. 2(d) shows a shape of a honeycomb structure.

FIGS. 3(a) to 3(c) are explanatory views schematically showing a method of processing of a peripheral portion of the crude honeycomb structure by one continuous operation in the embodiment of the method of manufacturing the honeycomb structure of the present invention, wherein FIG. 3(a) shows a simple selvage trimming, FIG. 3(b) shows R selvage trimming, and FIG. 3(c) shows overall periphery curve processing, respectively.

FIGS. 4(a) and 4(b) are explanatory views and a partly enlarged view schematically showing a shape of honeycomb segments in the embodiment of the method of manufacturing the honeycomb structure of the present invention, wherein FIG. 4(a) shows a columnar prism having a square cross section, and FIG. 4(b) shows a columnar prism having a sector-shaped cross section, respectively.

BEST MODE FOR CARRYING OUT THE INVENTION

Figure 2A:
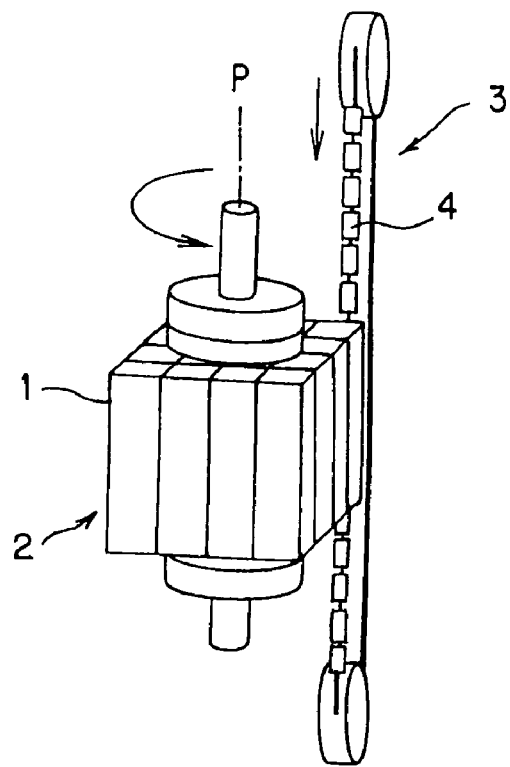

The embodiment of the method for manufacturing a honeycomb structure according to the present invention is specifically described below referring to the accompanying drawings. Note that, in the following description, a term "cross section" means "a cross section when it is cut along a plane perpendicular to a central axis of a honeycomb structure or a crude honeycomb structure" unless otherwise specified.

The gist of the method for manufacturing a honeycomb structure of the present invention is that processing a peripheral portion of a crude honeycomb structure to obtain a honeycomb structure with predetermined shape, wherein the processing a peripheral portion of a crude honeycomb structure is made by a cutter having linear cut-off device.

In this case, a bead saw can be preferably exemplified as the cutter, the bead saw having a linear cutter as a linear cutting device which includes a linear body such as a steel wire and the like and any of diamond abrasive grain, general grind stone and multi-blade cutter and the like is disposed on the linear body.

Specifically exemplified is a bead saw having a linear cutter made of an endless steel wire having a diameter of about 4 to 5 mm, a linear tensile strength of about 200 kg and a linear speed of about 30 m/sec. The linear cutter has bead-shaped metal bond materials, which have a diameter of 8 to 10 mm and a length of about 6 mm and are fixed on the endless wire with a pitch of 25 mm, and each of the metal bond materials has abrasive grain (#40 to #200) buried therein. Otherwise, general grind stones or multi-blade cutters having the same shape as above are fixed on the endless wire with the pitch of 25 mm.

FIGS. 1(a) to 1(e) are explanatory view schematically showing one embodiment of the method for manufacturing a honeycomb structure according to the present invention.

As shown in FIG. 1(a), the embodiment is arranged to obtain a honeycomb structure 10 having a shape shown in FIG. 1(b) by forming honeycomb segments 1 having cells disposed parallel to an axial direction of the honeycomb segment, each cell being surrounded by porous partition walls functioning as filters, and each cell functioning as a fluid passage (forming process is not shown), combining the honeycomb segments 1 to form a crude honeycomb structure 2 (forming process is not shown), and processing a peripheral portion of the crude honeycomb structure 2 by a bead saw 3 having a linear cutter 4. As shown in a partly enlarged view of FIG. 1(a), the linear cutter 4 in the embodiment is arranged by fixing the diamond abrasive grain (FIG. 1(c)), the general grind stone (FIG. 1(d)), the multi-blade cutter (FIG. 1(e)), and the like on the endless steel wire and the like described above in a beaded state.

When a body to be processed is the crude honeycomb structure 2, which is formed by combining the honeycomb segments 1 and liable to be broken (when the body is formed in a rectangular parallelepiped shape, it is particularly liable to be broken) as described above, the honeycomb structure 10 can be effectively manufactured at low cost.

FIGS. 2(a) to 2(d) are explanatory view schematically showing another embodiment of the method for manufacturing a honeycomb structure according to the present invention.

Figure 2B:
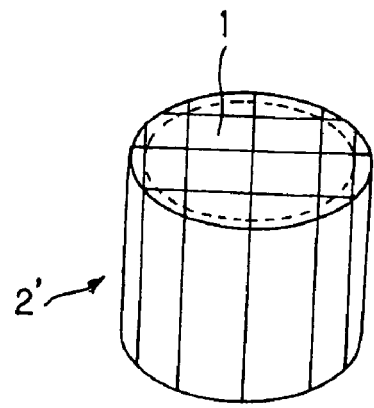
Figure 2C:
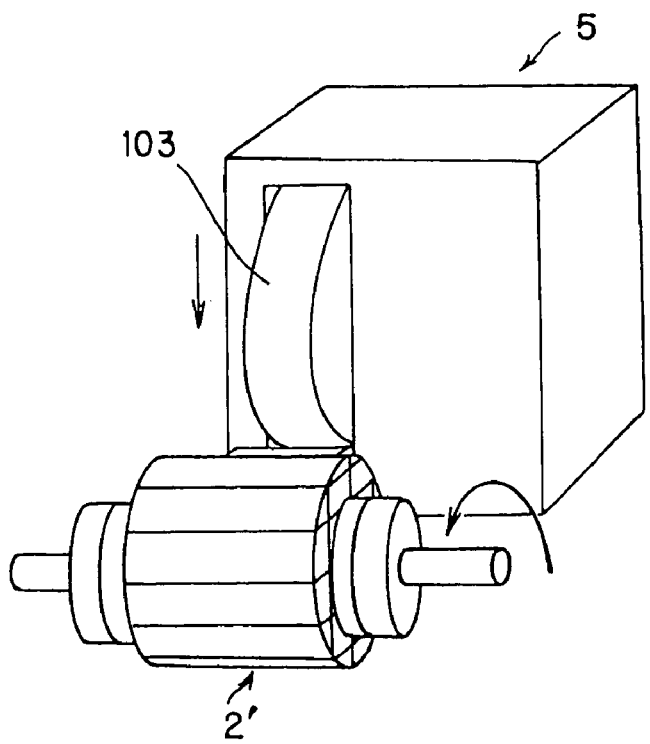
Figure 2D:
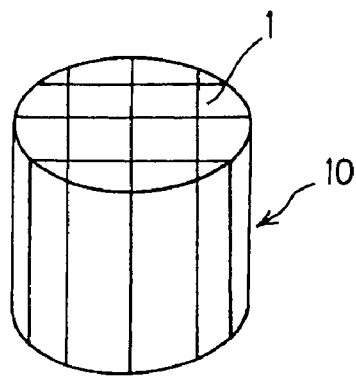

As shown in FIG. 2(a), the embodiment is arranged to obtain a honeycomb structure 10 shown in FIG. 2(d) by forming honeycomb segments 1 having cells disposed parallel to a central axis of the honeycomb segment, each cell being surrounded by porous partition walls functioning as filters, and each cell functioning as a fluid passage (forming process is not shown), combining the honeycomb segments to form a crude honeycomb structure 2 (forming process is not shown), roughly processing a peripheral portion of the crude honeycomb structure 2 by a bead saw 3 having a linear cutter 4 to obtain a roughly processed honeycomb structure 2' having a shape shown in FIG. 2(b) (the shape is slightly larger than that of a finally obtained honeycomb structure), and finishing the roughly processed honeycomb structure 2' by a grind stone 103 of a cam grinder 5 as shown in FIG. 2(c). The bead saw 3, and the like used in the embodiment are the same as those used in the embodiment described above.

As described above, the processing is divided into two steps. First, the peripheral portion of the crude honeycomb structure, which is liable to be broken, is roughly processed using the bead saw which can conduct processing without causing breakage of the crude honeycomb structure to thereby form the roughly processed honeycomb structure 2' having a reduced processing margin. Then, the honeycomb structure 2' is finished using the cam grinder. As a result, breakage of the honeycomb structure can be prevented before it happens by reducing the processing margin as well as highly accurate processing of the peripheral portion can be realized.

In the embodiment described above, when the peripheral portion of the crude honeycomb structure 2 is processed using the bead saw 3 as shown in FIGS. 1(a) and 2(a), it is preferable to rotate the crude honeycomb structure 2 about a central axis P as shown in FIGS. 1(a) and 2(a), to cause the linear cutter 4 of the bead saw 3 to travel in a direction of the central axis as shown in FIGS. 1(a) and 2(a), and to press the linear cutter 4 against the crude honeycomb structure 2 from a side face thereof.

With the above arrangement, the linear cutter rotates on its axis while traveling in the direction of the central axis of the crude honeycomb structure. Accordingly, the honeycomb structure can be manufactured more effectively at low cost utilizing characteristics of the bead saw such as a processing resistance reducing effect resulting from that an entire periphery of the cutter contributes to processing, a processing resistance reducing effect resulting from that the processing is conducted intermittently due to the beaded state, a processing resistance reducing effect and a high chip discharging effect resulting from that the cutter comes into contact with the body to be processed in a semi-round shape because it is the liner cutter, and an effect that an excessive force is unlike to be applied to the body to be processed because the cutter appropriately sags due to its linear shape.

In this case, it is preferable to process the peripheral portion of the crude honeycomb structure 2 by one continuous operation after the linear cutter 4 is pressed against the crude honeycomb structure 2 from the side face thereof.

Figure 3A:
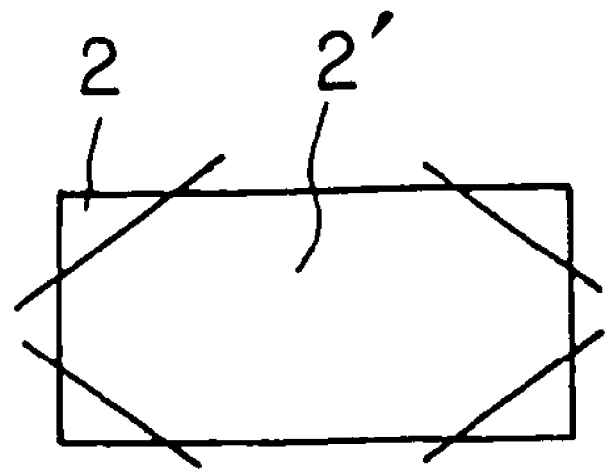
Figure 3B:
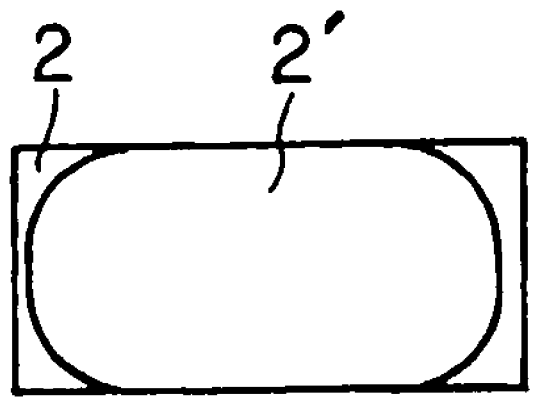
Figure 3C:
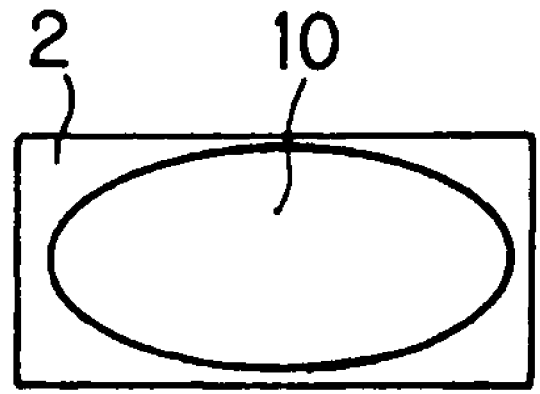

When the peripheral portion of the crude honeycomb structure 2 is processed by the one continuous operation (operation without a halt) as described above, any of simple selvage trimming (3(a)), R selvage trimming (FIG. 3(b)), and overall periphery processing (FIG. 3(c)) may be used as shown in FIGS. 3(a) to 3(c). Note that FIGS. 3(a) and 3(b) show a case that the crude honeycomb structure 2' is obtained after the processing, and FIG. 3(c) shows a case that the honeycomb structure 10 is obtained after the processing (this may be also used in a case that the crude honeycomb structure 2' is obtained after the processing).

With the above arrangement, the honeycomb structure can be more effectively manufactured at low cost by utilizing the characteristics of the bead saw which can conduct a series of operation without a halt.

Further, it is preferable to process the peripheral portion of the crude honeycomb structure so that a cross section thereof has a shape corresponding to an internal shape of a metal can body, and the like in which the crude honeycomb structure is accommodated. Otherwise, it is preferable to process the peripheral portion of the crude honeycomb structure to a predetermined shape, for example, a round shape, an oval shape, an elliptical shape, a triangular shape, a polygonal shape, an irregular shape, and the like.

With the above arrangement, the characteristics of the bead saw 3 described above can be sufficiently utilized.

Further, various shapes of the honeycomb structure may be manufactured by moving the linear cutter in synchronism with rotation of the crude honeycomb structure (porous ceramic material) under numerical control (NC) using a computer.

There is no particular restriction as to the method of forming the honeycomb segment 1, and, in general, any method of manufacturing a body having a honeycomb structure can be used. For example, the honeycomb segment 1 can be manufactured by the following method.

AS a raw material for the honeycomb segment 1, there is used, at least one kind of ceramic selected from the group consisting of silicon carbide, silicon nitride, cordierite, alumina, mullite, zirconia, zirconium phosphate, aluminum titanate, titania and combinations thereof; a Fe—Cr—Al type metal; a nickel-based metal, a combination of metallic Si and Sic; or the like as a major component (the major component refers to component which constitutes 80% by mass or more of the total components and which become a main crystal phase). Thereto are added a binder such as methyl cellulose, hydroxypropoxyl methyl cellulose or the like, a surfactant, water, etc. to obtain kneaded clay having plasticity.

Figure 4A:
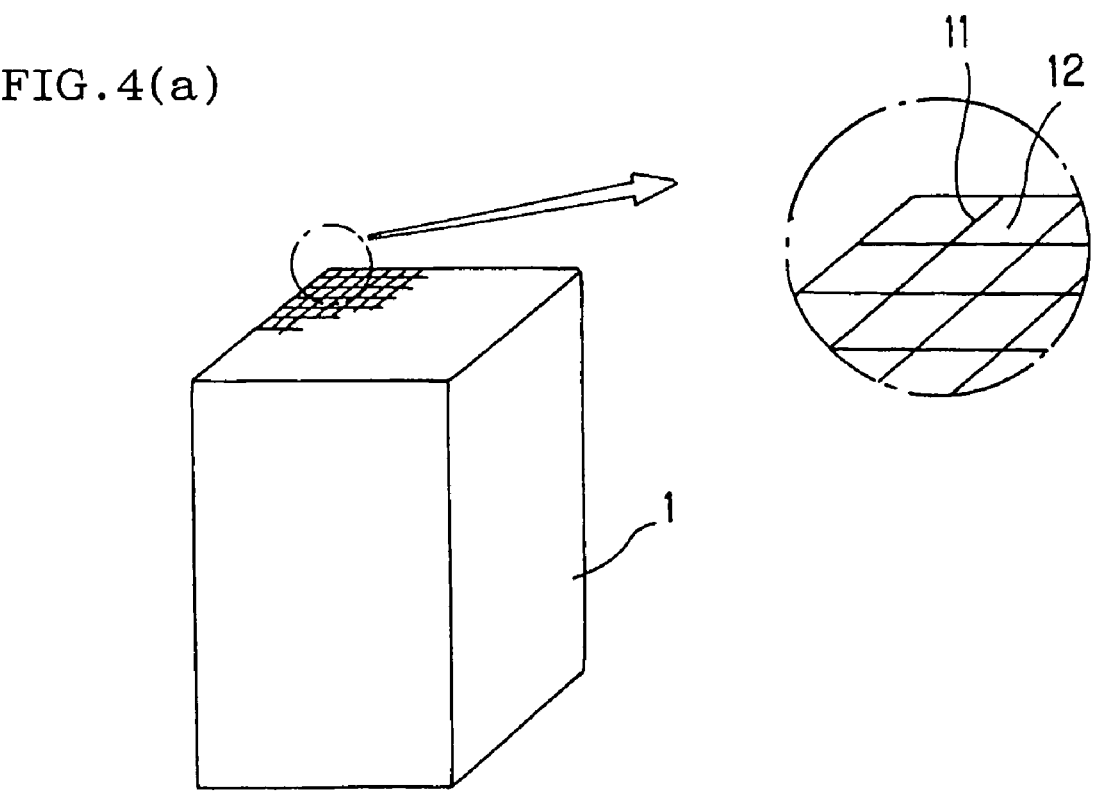
Figure 4B:
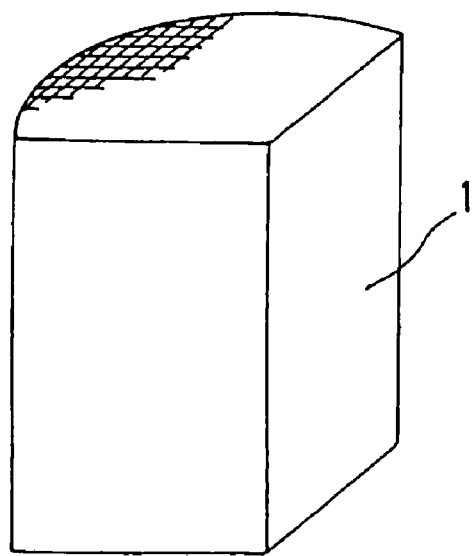
Figure 5:
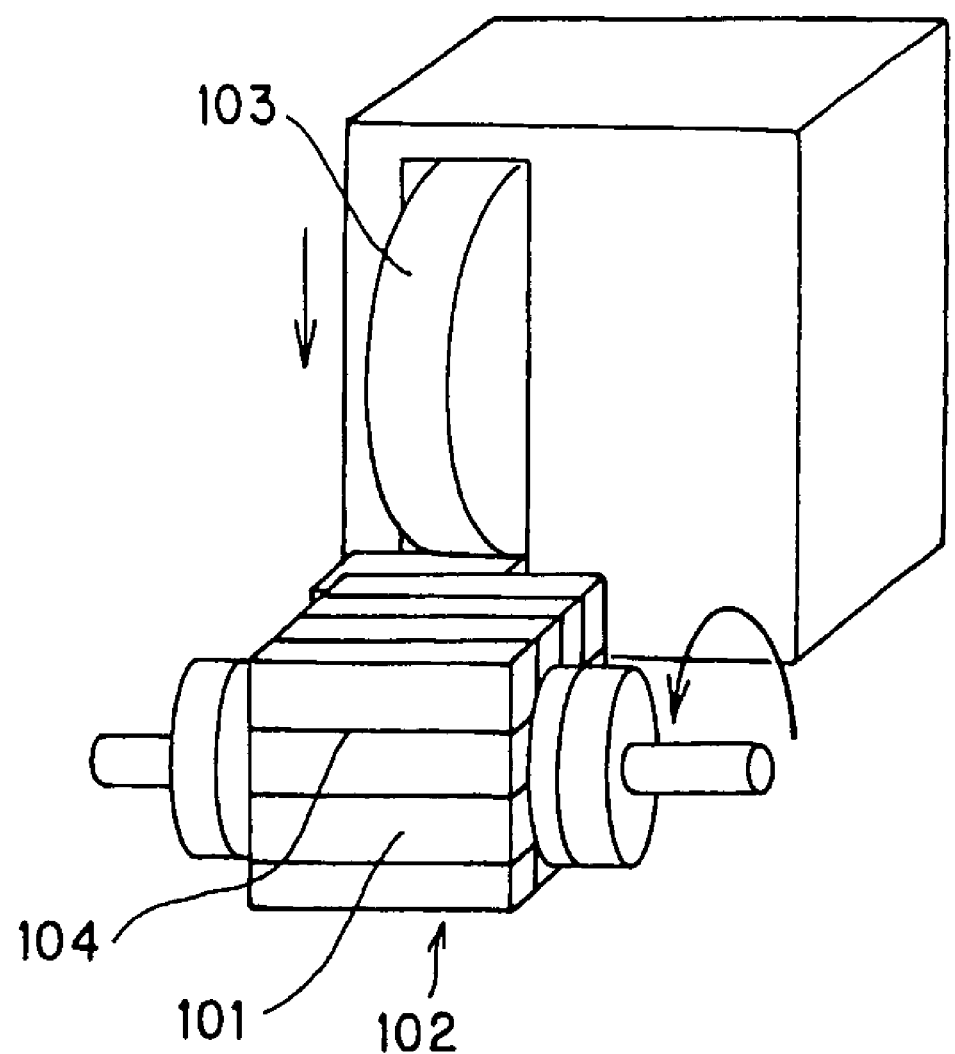
FIG. 5 is an explanatory view showing one example of the conventional method for manufacturing a honeycomb structure.

The kneaded clay is, for example, extruded to thereby form a honeycomb structure having cells 12 functioning as flow paths disposed parallel to an axial direction as shown in FIG. 4(a), each cell being surrounded by porous partition walls 11. Then, the honeycomb segment 1 as shown in FIG. 4(a) can be manufactured by firing the honeycomb structure after the same is dried by, for example, microwaves, hot air, and the like.

Note that when the honeycomb segment is composed of metal Si and SiC, it is preferable that a content of Si defined by Si/(Si+SiC) is 5 to 50% by mass. In this case, it is preferable that a bonding agent contains the metal Si and SiC or any one of them.

There is no restriction as to the cell density (the number of cells per unit sectional area) of the honeycomb segment 1. The cell density is preferably 0.9 to 310 cells/cm$^2$ (6 to 2,000 cells/in.$^2$). Further, although there is no particular restriction as to the sectional shape of the cell (cell shape), a polygonal shape such as a triangular shape, a square shape, a hexagonal shape, and the like, a round shape, an elliptical shape, a corrugated shape, and the like can be exemplified. Among them, the triangular shape, the square shape, and the hexagonal shape are preferable from a view point of production. There is no particular restriction as to the thickness of the partition wall. The thickness is in a range of preferably 50 to 2,000 µm.

Further, although there is no particular restriction as to shape of the honeycomb segment 1, a columnar body having a square sectional shape (quadratic prism) as shown in, for example, FIG. 4(a) can be exemplified. Further, a columnar body having a sector shape as shown in FIG. (4b) can be also exemplified.

In the embodiment, after the honeycomb segments 1 are manufactured, the crude honeycomb structure 2 is formed by combining them by bonding them to each other by a bonding agent.

Note that, there is no particular restriction as to the shape of the crude honeycomb structure 2 having the combined honeycomb segments 1, a columnar body (rectangular parallelepiped) having a square cross section as shown in, for example, FIG. 1(a) can be exemplified. In addition to the above, the crude honeycomb structure 2 may be a columnar body having a round cross section, an oval-shaped cross section, an elliptical cross section, a polygonal cross section, a triangular cross section, and the like.

A method of, for example, applying a bonding agent to at least one of confronting bonding surfaces of two honeycomb segments to be combined and bonding these bonding surfaces to each other is exemplified as a specific method of forming the crude honeycomb structure. In this case, bonding is preferably conducted by pressing the to-be-bonded honeycomb segments, because it is easy and good bonding strength can be obtained. In this case, an inorganic or organic spacer, for example, may be interposed between the honeycomb segments to be combined to obtain a honeycomb structure with good dimensional accuracy by making uniform a thickness of a bonding layer between the honeycomb segments to be combined.

There is no restriction as to the type of the bonding agent used in the embodiment, and any known bonding agent suitable for a material of the honeycomb segment may be used. For example, a bonding agent, in which inorganic fibers such as ceramic fibers and the like, inorganic powder such as ceramic powder and the like, an inorganic or organic binder, and the like are blended, is preferably used. Further, the bonding agent may contain a sol-like material such a Si sol, and the like. A plurality of different bonding agents may be used and, in this case, the bonding layer may be formed as a plurality of layers. When the bonding layer is formed as a plurality of layers, the composition of, for example, the bonding layer in contact with honeycomb segment may be made so as to have a composition close to the composition of the honeycomb segment and the compositions of other bonding layers may changed gradually. Further, the bonding agents having at least the two different compositions may be separately applied one by one so that the bonding layer is formed as a plurality of layers. When the bonding layer is formed as a plurality of layers, the composition of, for example, the bonding layer in contact with honeycomb segment may be made so as to have a composition close to the composition of the honeycomb segment and the compositions of other bonding layers may changed gradually. Depending upon the kind of the bonding agent used, larger bonding strength can be obtained by further conducting drying and/or firing. There is no particular restriction as to the thickness of the bonded layer, it is preferably 0.1 to 3.0 mm.

Further, when the honeycomb structure obtained finally in the embodiment described above is used as filter, in particular, as a DPF, and the like, it is preferable to plug open end faces of the cells by a sealant so that the end faces are alternately formed in a checkered pattern. Plugging by a sealant can be conducted by masking cells that are not to be plugged, applying a slurry-state sealant to each open end face of honeycomb segment, and drying and firing the resulting honeycomb segment. In this case, the plugging is preferably conducted during the above-mentioned steps of producing a honeycomb segment, that is, after forming of honeycomb segment and before firing, because the firing step may be once. However, the plugging may be conducted after firing, or at any timing after forming. Further, the crude honeycomb structure, the roughly processed honeycomb body, or the honeycomb body may be plugged after they are formed.

The plugging may be conducted after the firing and may be conducted at any timing as long as it is conducted after the forming. The material for the sealant used can be appropriately selected from the above-mentioned group of preferred raw materials for the honeycomb segment, and it is preferred to use the same raw material as for honeycomb segment.

Further, a catalyst may be carried by the crude honeycomb structure or the honeycomb structure. Although there is no particular restriction as to the method thereof, a method of carrying the catalyst by, for example, wash coating, drying, and firing a catalyst slurry can be exemplified. This step also can be conducted at any timing as long as it is conducted after the forming of honeycomb segment.

As mentioned above, when the honeycomb structure obtained by the embodiment is used as a catalyst carrier in an internal combustion engine, a boiler, a chemical reactor, a reformer for fuel cell, etc., the honeycomb structure is preferred to carry a metal having a catalytic action. The representative examples of the material having the catalytic action include Pt, Pd, Rh, and the like. It is preferable to cause the honeycomb structure to carry at least one kind of these materials.

It is possible to provide the honeycomb structure obtained in the embodiment with a dimensional accuracy of about ±1 mm. This accuracy can sufficiently cope with a case that coating is applied to the peripheral portion at the next step. Further, a honeycomb structure having excellent quality without defects such as chipping, cracks, and exfoliation, breakage and the like of bonded faces can be obtained. Further, the liner cutter has a long life and is economical without generation of eccentric wear.

The method for manufacturing a honeycomb structure according to the present invention is described in more detail below by way of Examples.

EXAMPLES 1 TO 5

(Production of a Honeycomb Segment)

A silicon carbide powder and a silicon powder were used as raw materials. Thereto were added methyl cellulose, hydroxypropoxyl methyl cellulose, a surfactant and water to produce kneaded clay having plasticity. This kneaded clay was subjected to extrusion, and the resulting extrudate was dried using a microwave and hot air. Then, the formed body was heated (for removing binder) and fired in the atmosphere to obtain a quadrangular prism shaped honeycomb segment such as shown in FIG. 4(a), having a dimension of 58 mm×58 mm×150 mm (height).

There were prepared two honeycomb segments produced above, a paper board (as a spacer) having a dimension of 50 mm×10 mm×0.8 mm (thickness), and a ceramic-made bonding agent composed of 40% by mass of SiC, 20% by mass of a silica sol, 1% by mass of an inorganic auxiliary agent, 30% by mass of a ceramic fiber and 9% by mass of water. The ceramic-made bonding agent was applied to a side of one honeycomb segment, i.e. the surface, which is to be bonded; the paper board was placed on the upper and lower areas of the side; and the two honeycomb segments were pressed-bonded and then dried; thereby was obtained a crude honeycomb structure in which the two honeycomb segments were combined.

(Processing a Peripheral Portion of the Crude Honeycomb Structure)

Elliptical honeycomb structures each having a long diameter of 185 mm, a short diameter of 90 mm, and an elliptical cross sectional shape were formed of a crude honeycomb structure of 230×117×300 mm (height) using, as the bead saw, a Beads One (brand name) of Dainaka Seiki Inc. (diamond wire: diameter; 8 mm, length; 4.6 m, linear speed; 30 m/sec, linear tensile strength; 200 kg, the number of revolution of table; 30 to 150/sec, simple selvage trimming, R selvage trimming, and processing without a halt can be conducted). Table 1 shows the results of measurement of differences of diameter (degree of cylindricality) at both the ends and an intermediate position of the thus obtained honeycomb structures in a center axis thereof. Note that the same operation was conducted five times using the crude honeycomb structures having the same size. Resultant crude honeycomb structures are shown as embodiments 1 to 5.

COMPARATIVE EXAMPLES 1 TO 5

Elliptical honeycomb structures each having a long diameter of 185 mm, a short diameter of 90 mm, and an elliptical sectional shape were formed of a crude honeycomb structure of 230×117×300 mm (height) likewise the embodiments 1 to 5 using only a synchronized cylindrical grinder (brand name; Cam Grinder) of Toyoda machine works, LTD. (diamond grind stone: diameter; 350 mm, thickness; 30 mm, grind stone peripheral velocity; 80 m/sec, the number of revolution of work (body to be processed); 10 to 30 rpm, peripheral portion can be processed). Table 1 shows the results of measurement of differences of diameter (degree of cylindricality) at both the ends and an intermediate position of the thus obtained honeycomb structures in a center axis thereof. Note that the same operation was conducted five times using crude honeycomb structures having the same size. Resulting crude honeycomb structures are shown as comparative examples 1 to 5. A mark "x" in a column of degree of cylindricality resulting from processing in Table 1 shows that measurement was impossible.

EXAMPLES 6 TO 10

Elliptical honeycomb structures were formed likewise the embodiments 1 to 5 except that crude honeycomb structures subjected to R selvage trimming by a bead saw as rough processing were finished by a cam grinder. Table 1 shows the results of measurement of differences of diameter (degree of cylindricality) at both the ends and an intermediate position of the thus obtained honeycomb structures in a center axis thereof. Note that the two processing steps took the same processing time (1 minute×twice). The same operation was conducted five times using crude honeycomb structures having the same size. The results of measurement are shown as the embodiments 6 to 10.

TABLE 1

|  | Procesing time | Degree of cylindricality resulting from processing (mm) | Presence or absence of breakage of body to be processed |
| --- | --- | --- | --- |
| Comparative example 1 | 3 minutes and 20 seconds | 0.08 | Absent |
| Comparative example 2 | 3 minutes and 20 seconds | X | Present |
| Comparative example 3 | 3 minutes and 20 seconds | X | Present |
| Comparative example 4 | 3 minutes and 20 seconds | X | Present |
| Comparative example 5 | 3 minutes and 20 seconds | 0.08 | Absent |
| Embodiment 1 | 3 minutes | 0.10 | Absent |
| Embodiment 2 | 3 minutes | 0.09 | Absent |
| Embodiment 3 | 3 minutes | 0.10 | Absent |
| Embodiment 4 | 3 minutes | 0.10 | Absent |
| Embodiment 5 | 3 minutes | 0.09 | Absent |
| Embodiment 6 | 2 minutes | 0.08 | Absent |
| Embodiment 7 | 2 minutes | 0.04 | Absent |
| Embodiment 8 | 2 minutes | 0.05 | Absent |
| Embodiment 9 | 2 minutes | 0.08 | Absent |
| Embodiment 10 | 2 minutes | 0.08 | Absent |

From Table 1, it can be found that when the processing operation was conducted using only the cam grinder as in the comparative examples 1 to 5, there was a possibility that breakage was generated. When, however, the processing operation was conducted by the bead saw as in the embodiments 1 to 5, it could be conducted without generation of breakage. Further, it can be found that when the crude honeycomb structures, which had been subjected to the R selvage trimming by the bead saw as the rough processing, were finished by the cam grinder, the crude honeycomb structures could be processed with high accuracy without breakage. Note that in the comparative examples to which only the cam grinder was used, there was a case that the bodies to be processed were not broken as in the comparative examples 1 and 5. However, there was a high probability that the bodies to be processed were broken as in the comparative examples 2 to 4 as well as "degree of cylindricality resulting from processing" had an accuracy higher than necessary and a long processing time of 3 minutes and 20 seconds was consumed by it, which is not satisfactory from a view point of efficiency.

INDUSTRIAL APPLICABILITY

As described above, according to the method for manufacturing a honeycomb structure of the present invention, there is provided the method which can be low in cost and efficiently manufacture a honeycomb structure suitably used as a carrier for a catalyst having a catalytic action, for use in internal combustion engine, boiler, chemical reactor, reformer for fuel cell, etc., or as a filter for trapping particulate matter present in an exhaust gas.

The invention claimed is:

1. A method for manufacturing a honeycomb structure comprising steps of:
   forming honeycomb segments each having cells disposed parallel to a central axis of a respective honeycomb segment, each cell being surrounded by porous partition walls functioning as filters, and each cell functioning as a fluid passage;
   combining the honeycomb segments to form a crude honeycomb structure using a bonding agent;
   processing a peripheral portion of the crude honeycomb structure to obtain a honeycomb structure with a predetermined shape; and
   finishing the processed honeycomb structure to obtain the honeycomb structure with the predetermined shape,
   wherein the step of processing a peripheral portion of a crude honeycomb structure is made by a cutter having linear cut-off device, the cutter is a bead saw.

2. The method for manufacturing a honeycomb structure according to claim 1, wherein the cutter is a linear cutter as the linear cutting device comprising a linear body and any of diamond abrasive grain, general grind stone and multi-blade cutter disposed on the linear body.

3. The method for manufacturing a honeycomb structure according to claim 1, wherein the method comprises step of:
   processing the crude honeycomb structure by the bead saw to obtain a honeycomb structure with a predetermined shape.

4. The method for manufacturing a honeycomb structure according to claim 1, wherein the method comprising steps of:
   roughly processing the crude honeycomb structure by the bead saw to obtain a roughly processed honeycomb structure with a predetermined shape.

5. The method for manufacturing a honeycomb structure according to claim 2, wherein the step of processing the peripheral portion of the crude honeycomb structure is made by rotating the crude honeycomb structure about a central axis thereof, causing the linear cutter of the bead saw to travel in a direction of the central axis, and pressing the linear cutter against the crude honeycomb structure from a side face thereof.

6. The method for manufacturing a honeycomb structure according to claim 5, wherein the step of processing the peripheral portion of the crude honeycomb structure is made by one continuous operation after the linear cutter is pressed against the crude honeycomb structure from the side face thereof.

7. The method for manufacturing a honeycomb structure according to claim 2, wherein the peripheral portion of the crude honeycomb structure is processed such that a sectional shape of the crude honeycomb structure is formed in a round shape, an oval shape, an elliptical shape, a triangular shape, a polygonal shape, or an irregular shape when it is cut off along a plane perpendicular to the central axis thereof.

8. The method for manufacturing a honeycomb structure according to claim 2, wherein the method comprising step of:
   processing the crude honeycomb structure by the bead saw to obtain a honeycomb structure with a predetermined shape.

9. The method for manufacturing a honeycomb structure according to claim 2, wherein the method comprising steps of:
   roughly processing the crude honeycomb structure by the bead saw to obtain a roughly processed honeycomb structure with a predetermined shape.

10. The method for manufacturing a honeycomb structure according to claim 3, wherein the step of processing the peripheral portion of the crude honeycomb structure is made by rotating the crude honeycomb structure about a central axis thereof, causing the linear cutter of the bead saw to travel in a direction of the central axis, and pressing the linear cutter against the crude honeycomb structure from a side face thereof.

11. The method for manufacturing a honeycomb structure according to claim 4, wherein the step of processing the peripheral portion of the crude honeycomb structure is made by rotating the crude honeycomb structure about a central axis thereof, causing the linear cutter of the bead saw to travel in a direction of the central axis, and pressing the linear cutter against the crude honeycomb structure from a side face thereof.

12. The method for manufacturing a honeycomb structure according to claim 2, wherein the peripheral portion of the crude honeycomb structure is processed such that a sectional shape of the crude honeycomb structure is formed in a round shape, an oval shape, an elliptical shape, a triangular shape, a polygonal shape, or an irregular shape when it is cut off along a plane perpendicular to the central axis thereof.

13. The method for manufacturing a honeycomb structure according to claim 3, wherein the peripheral portion of the crude honeycomb structure is processed such that a sectional shape of the crude honeycomb structure is formed in a round shape, an oval shape, an elliptical shape, a triangular shape, a polygonal shape, or an irregular shape when it is cut off along a plane perpendicular to the central axis thereof.

14. The method for manufacturing a honeycomb structure according to claim 4, wherein the peripheral portion of the crude honeycomb structure is processed such that a sectional shape of the crude honeycomb structure is formed in a round shape, an oval shape, an elliptical shape, a triangular shape, a polygonal shape, or an irregular shape when it is cut off along a plane perpendicular to the central axis thereof.

15. The method for manufacturing a honeycomb structure according to claim 5, wherein the peripheral portion of the crude honeycomb structure is processed such that a sectional shape of the crude honeycomb structure is formed in a round shape, an oval shape, an elliptical shape, a triangular shape, a polygonal shape, or an irregular shape when it is cut off along a plane perpendicular to the central axis thereof.

16. The method for manufacturing a honeycomb structure according to claim 6, wherein the peripheral portion of the crude honeycomb structure is processed such that a sectional shape of the crude honeycomb structure is formed in a round shape, an oval shape, an elliptical shape, a triangular shape, a polygonal shape, or an irregular shape when it is cut off along a plane perpendicular to the central axis thereof.

17. The method for manufacturing a honeycomb structure according to claim 1, wherein the cut-off device rotates about an axis of the cut-off device in addition to moving in a linear direction.

18. The method for manufacturing a honeycomb structure according to claim 1, wherein the predetermined shape is a non-round shape.

19. The method of manufacturing a honeycomb structure according to claim 1, wherein the bead saw comprises an endless wire and a plurality of bead-shaped members made of metal bond material, the beed-shaped members being fixed on the endless wire at a predetermined pitch.

20. The method for manufacturing a honeycomb structure according to claim 19, wherein:

the endless wire is made of steel and has a diameter between about 4 and 5 mm;

the bead-shaped members each has a diameter between about 8 and 10 mm and a length of about 6 mm; and the pitch is about 25 mm.

21. The method for manufacturing a honeycomb structure according to claim 1, wherein the processing is performed in one continuous operation and includes any of selvage trimming and R selvage trimming.

22. The method for manufacturing a honeycomb structure according to claim 1, wherein the finishing includes grinding the processed honeycomb structure.

* * * * *